(12) United States Patent
Emoto

(10) Patent No.: US 6,731,860 B1
(45) Date of Patent: May 4, 2004

(54) VIDEO REPRODUCTION CONTROLLER FOR CONTROLLING REPRODUCTION OF A RECORDED SPECIAL VIDEO AND A STORAGE MEDIUM FOR THE VIDEO REPRODUCTION CONTROLLER

(75) Inventor: Masaki Emoto, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 09/243,843

(22) Filed: Feb. 3, 1999

(30) Foreign Application Priority Data

Apr. 15, 1998 (JP) .......................................... 10-105112

(51) Int. Cl.[7] ................................................ H04N 5/93
(52) U.S. Cl. .......................................... 386/52; 386/64
(58) Field of Search .......................... 386/4, 21, 45–46, 386/52, 64, 113; 348/700–701; 360/25, 31, 48, 53, 69

(56) References Cited

U.S. PATENT DOCUMENTS

| 4,774,600 | A | | 9/1988 | Baumeister | |
|---|---|---|---|---|---|
| 5,333,091 | A | | 7/1994 | Iggulden et al. | |
| 5,537,217 | A | | 7/1996 | Kajita et al. | |
| 5,596,419 | A | | 1/1997 | Yoshimura et al. | |
| 5,615,223 | A | * | 3/1997 | Carr | 360/46 |
| 5,642,174 | A | * | 6/1997 | Kazui et al. | 348/699 |
| 5,675,586 | A | * | 10/1997 | Sako et al. | 360/48 |
| 5,684,918 | A | * | 11/1997 | Abecassis | 386/83 |
| 5,696,866 | A | * | 12/1997 | Iggulden et al. | 358/908 |
| 5,696,869 | A | * | 12/1997 | Abecassis | 386/52 |
| 5,933,569 | A | * | 8/1999 | Sawabe et al. | 386/94 |
| 6,025,886 | A | * | 2/2000 | Koda | 348/700 |
| 6,157,744 | A | * | 12/2000 | Nagasaka et al. | 382/236 |
| 6,327,105 | B1 | * | 12/2001 | DeForest | 360/48 |
| 6,408,089 | B1 | * | 6/2002 | Ito et al. | 382/141 |

FOREIGN PATENT DOCUMENTS

| EP | 0 378 393 A2 | | 7/1990 |
|---|---|---|---|
| EP | 0810794 A2 | * | 3/1997 |
| JP | 2-185781 A | | 7/1990 |
| JP | 4-117686 A | | 4/1992 |
| JP | 09284698 A | | 10/1997 |
| WO | WO 99/40587 | | 8/1999 |

* cited by examiner

Primary Examiner—Thai Tran
Assistant Examiner—Polin Chieu
(74) Attorney, Agent, or Firm—Workman Nydegger

(57) ABSTRACT

When, during the replay of the VTR, time codes are sent to the control unit and the special part detection device supplies detection data to the control unit, the control section displays an indication of the special parts being detected and the time codes found and transferred at detection time on the display device and the video monitor, and writes the detection data and the corresponding time codes into the memory. Hence, the contents of the special parts detected in the reproduced video (tape scratch, flicker, special pattern, or change in average luminance, and the levels of these) and the time codes found and transferred at detection time are stored, thus enhancing the efficiency of the editing of cutting off the special parts.

20 Claims, 16 Drawing Sheets

| EXAMPLE 1 | Z=X-Y |
|---|---|
| EXAMPLE 2 | Z=(X-Y)/max(X,Y,20)*128 |
| EXAMPLE 3 | Z=(X-Y)/max((X+Y)/2,20)*64 |
| EXAMPLE 4 | ARITHMETIC MEAN OF EXAMPLE 1 AND EXAMPLE 3 |

NOTE THAT THE RANGES OF X AND Y ARE(0,255), AND THE RANGE OF Z IS (-128,+127). Z IS CLIPPED AT THE UPPER LIMIT VALUE OR LOWER LIMIT VALUE SO THAT IT WILL NOT EXCEED THE RANGE.

FIG.6

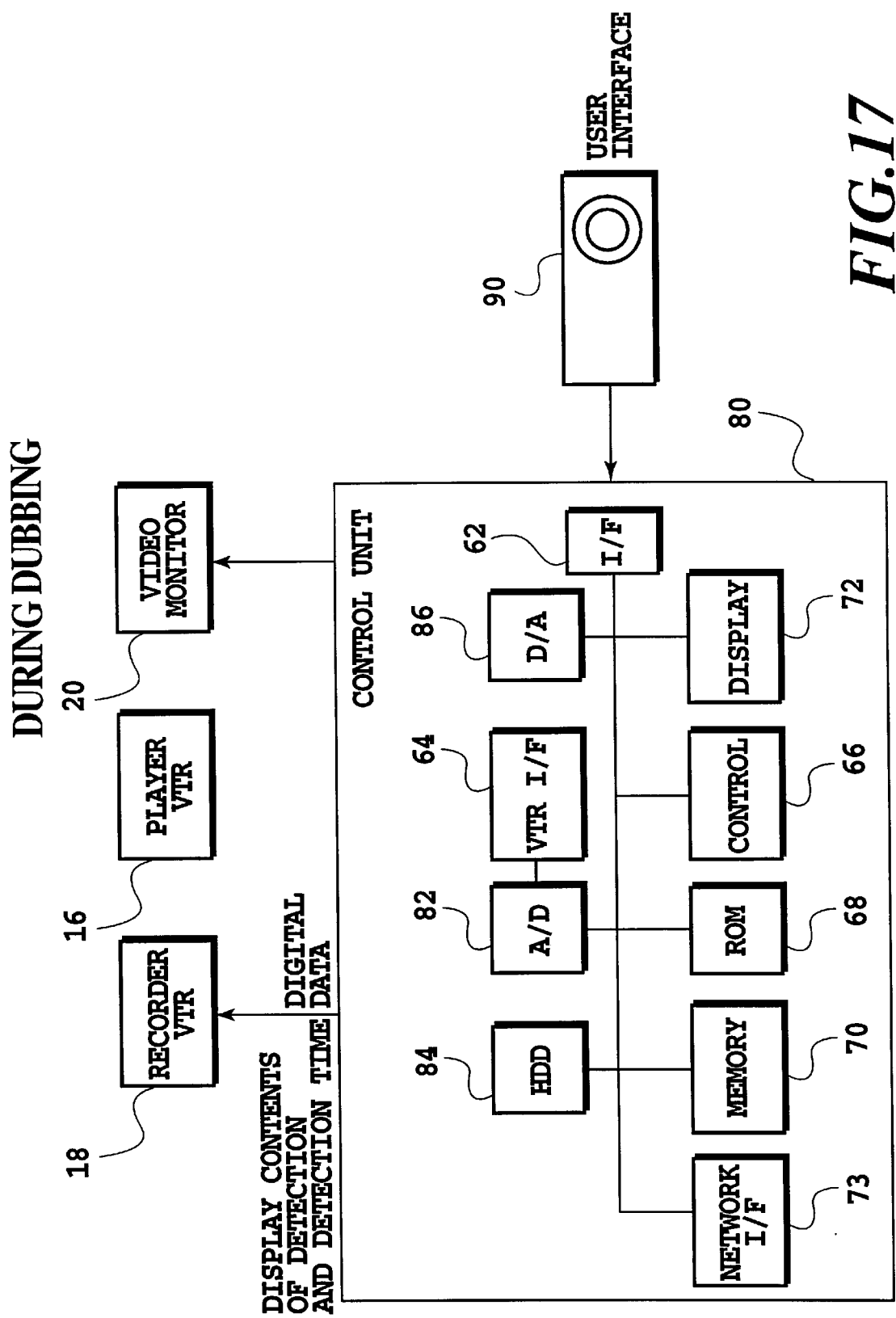

VIDEO REPRODUCTION CONTROLLER FOR CONTROLLING REPRODUCTION OF A RECORDED SPECIAL VIDEO AND A STORAGE MEDIUM FOR THE VIDEO REPRODUCTION CONTROLLER

This application is based on Patent Application No. 105,112/1998 filed Apr. 15, 1998 in Japan, the content of which is incorporated hereinto by reference.

BACKGROUND OF THE INVENTION

1. Field of the Invention

The present invention relates to a video reproduction controller and a storage medium and more particularly to a video reproduction controller and a storage medium which detect special parts of video data from a video reproducing device and control the video reproducing device based on an information about the positions of the detected special parts on the recording medium.

2. Description of the Related Art

When editing a reproduced video by using a video tape recorder to produce a broadcast program, inappropriate video scenes, such as those in a recorded video that are not necessary for making the program and those that may have undesirable effects on viewers, are cut off during dubbing and editing. In this specification the scenes that may have undesirable effects on the viewers are referred to as special parts. The special parts may include flawed video parts, such as tape scratches, and scenes using special effects that may be detrimental to the health of some viewers.

To remove these special parts a conventional practice involves reproducing a recorded video at a normal playback speed, visually checking for the presence or absence of special parts, recording replayed times of, if any, special parts that correspond to their positions on the tape, referencing the recorded times to cut out the special parts during editing, and then performing the dubbing.

The above conventional practice, however, requires an operator to check for the presence or absence of special parts and to control a reproducing video tape recorder during editing so that the removed parts (special parts) will not be dubbed, thus complicating editing operations.

Under these circumstances, the present invention has been accomplished to provide a video reproduction controller and a storage medium which overcome the above-mentioned drawback by recording position information of the detected special part and using the recorded information during dubbing.

SUMMARY OF THE INVENTION

The video reproduction controller of the invention comprises: an input means for inputting, from a video reproducing device, a position information about a recording medium when a special part is detected by the video reproducing device reproducing video data on the recording medium; a storage means for storing the position information; a display means for retrieving the position information from the storage means and displaying a position where the detected special part is recorded on the recording medium; a specification means for specifying from outside a replay position on the recording medium; and a control means for generating a control signal to control replaying of the video reproducing device based on the position information corresponding to the specified replay position.

The storage medium of the invention is removably loaded into a video reproduction controller and stores, in a predetermined format, a position information about a recording medium when a special part is detected by the video reproducing device reproducing video data on the recording medium.

The above and other objects, effects, features and advantages of the present invention will become more apparent from the following description of the embodiments thereof taken in conjunction with the accompanying drawings.

BRIEF DESCRIPTION OF THE DRAWINGS

FIG. 6 is an explanatory diagram showing the contents of processing performed by ROM 109;

FIG. 17 is a block diagram showing a configuration of the video reproduction controller of the third embodiment of the invention when it is performing editing.

DETAILED DESCRIPTION OF PREFERRED EMBODIMENTS

Figure 1:
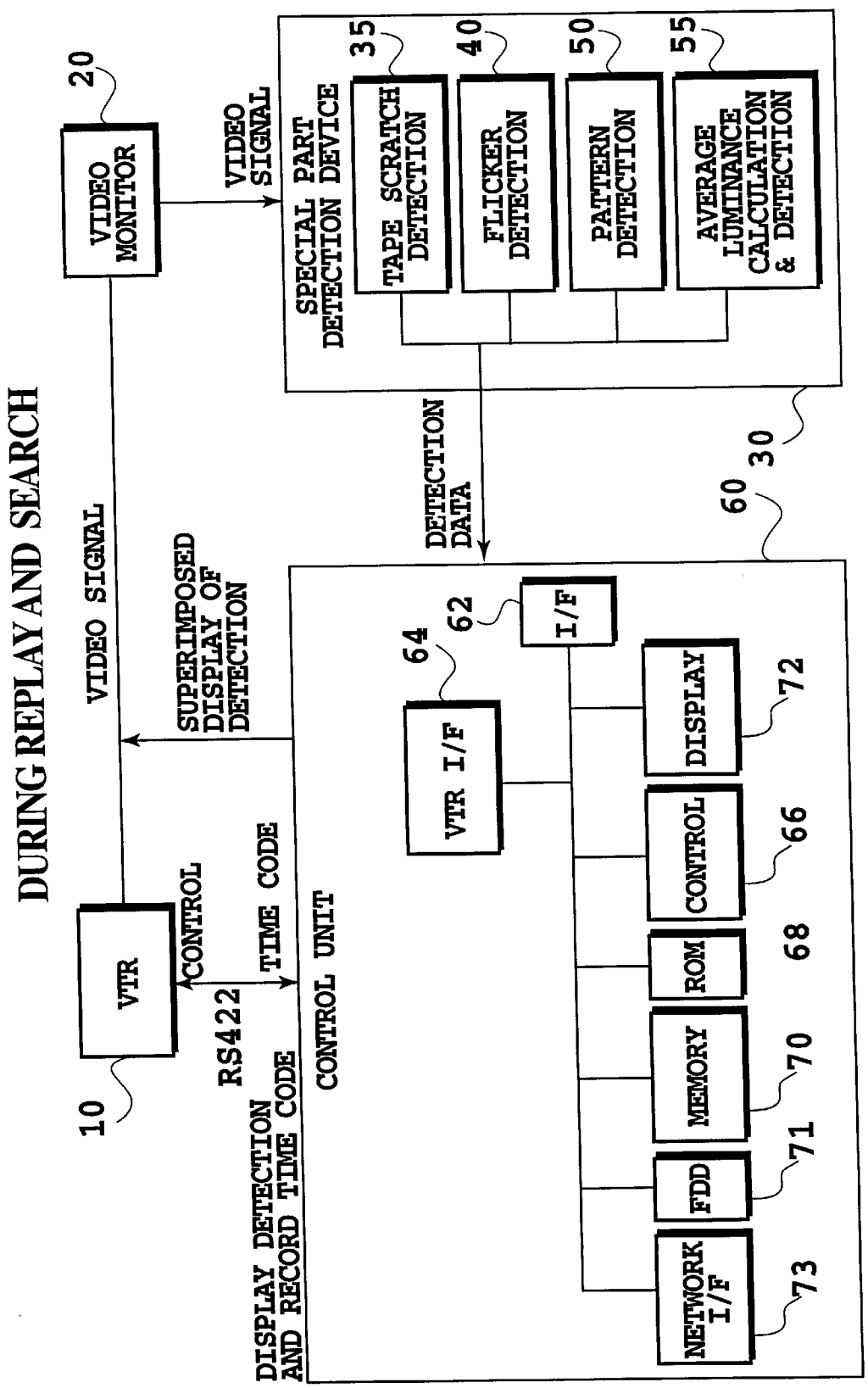
FIG. 1 is a block diagram showing a configuration of a video reproduction controller of a first embodiment of the invention when it is detecting special parts.
Figure 2:
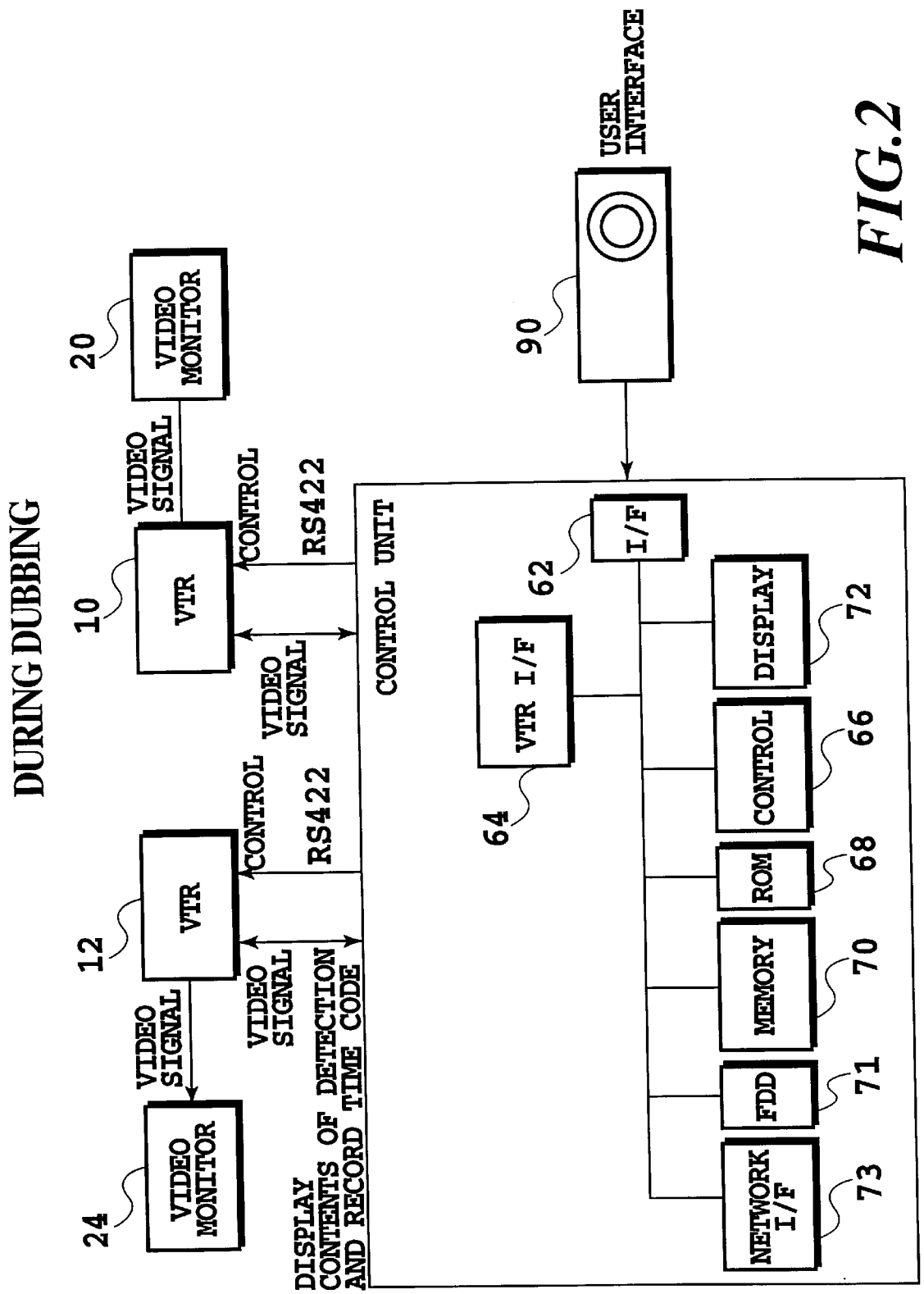
FIG. 2 is a block diagram showing a configuration of the video reproduction controller of the first embodiment of the invention when it is performing editing.

Embodiments of the present invention will be described in detail by referring to the accompanying drawings.
(First Embodiment)
FIGS. 1 and 2 are block diagrams showing the video reproduction controller as the first embodiment of the invention, FIG. 1 illustrating the configuration during detection of special parts and FIG. 2 illustrating the configuration during editing.

In these figures, reference numeral number 10 represents a video tape recorder having a known time code recording/reproducing function and a control function through a RS422. Here the video tape recorder is assumed to be of a type that outputs analog NTSC composite video signals or primary color signals. Reference numeral number 20 represents an universal type video monitor.

A special part detection device 30 receives a reproduced video signal directly from the VTR 10 or through the video monitor 20 and automatically detects special parts from the video signal as described later. When the special parts are detected, the special part detection device 30 outputs detection data.

Reference numeral number 60 represents a control unit that takes in the detection data from the special part detection device 30 via an interface (I/F) 62. The control unit 60 is connected to the VTR 10 via the RS422, transfers time codes to and from the VTR 10 via a VTR interface (VTRI/F) 64, records the time codes sent from the VTR 10 when it receives the detection data, and controls the operations of the VTR 10 to replay, stop and fast-feed during editing, by using the recorded time codes. The control unit 6 includes a control section 66 such as CPU, a ROM 68 storing software programs to be executed by the CPU, a memory device 70 such as RAM or NVRAM used as a working area of the CPU, and a display device 72.

The control unit 60 further includes a floppy disk drive (FDD) 71 and a network interface (I/F) 73. The FDD 71 can accommodate known floppy disks (not shown). Storing a position information in the edit decision list (EDL) format, standard format of a VTR editing device, to be described later in a floppy disk allows other editing devices to use the position information obtained with the control unit 60. Using the position information of other editing devices can also be achieved by communicating between these editing devices through the network I/F 73. In addition to the floppy disk, other storage media which data can be written into or read from, such as CD-R, MO, ZIP (registered trademark) and JAZ (registered trademark), can also be removably used on the editing devices.

A jog dial, shuttle dial, or joy stick may be used for an user interface 90 in the control unit 60.

A detailed explanation of the special part detection device 30 will follow. The detection device 30 examines the characteristics of the reproduced video sent from the VTR 10 to automatically detect special parts, and comprises a tape scratch detection section 35, a flicker detection section 40, a pattern detection section 50 and an average luminance calculation/detection section 55. With this configuration, the detection device 30 can afford to perform detection of flawed video parts resulting from tape scratches, detection of flickers that may cause photo-sensitive fits, detection of particular patterns that may cause pattern-sensitive fits among viewers, and detection of various special parts having sharp changes in average luminance. The tape scratch detection section 35 has a well-known configuration and thus the explanation will go to the flicker detection section 40, the pattern detection section 50 and the average luminance calculation/detection section 55.

Let us first explain about the flicker detection. A flicker is produced, as it is referred to in this specification, by two shots alternately edited with short time intervals. From this flicker definition, it follows that an image is expected to change into a darker direction with some delay after the image changes into a brighter direction at a given period. Conversely, after an image changes into a darker direction at a given period, the image is expected to change into a brighter direction with some delay. Based on this reasoning, the flicker detection of the embodiment checks whether a luminance of an image, after it has changed, returns or not to its almost original level with some delay. Here, the change of luminance in a scene means a field difference or frame difference. As to returns to the almost original level of luminance, it is decided that the luminance has returned to the almost original level if the correlation, which is calculated between a field difference or frame difference and the corresponding field difference or frame difference with an appropriate delay time, is found to be strongly negative. When such a luminance change and a return to the almost original luminance level occur frequently, i.e., when there is a periodicity in the luminance change, it is determined that a flicker has occurred.

Next, the flicker detection method as performed by the flicker detection section 40 will be described.

Figure 3:
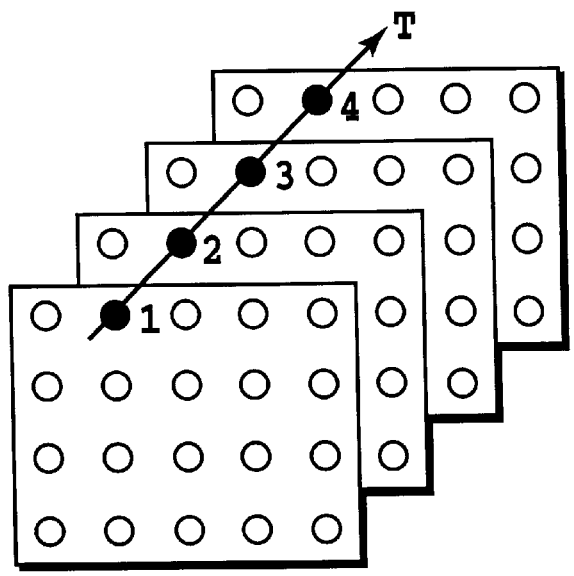
FIG. 3 is a schematic diagram showing a frame or field structure of an image.
Figure 4:
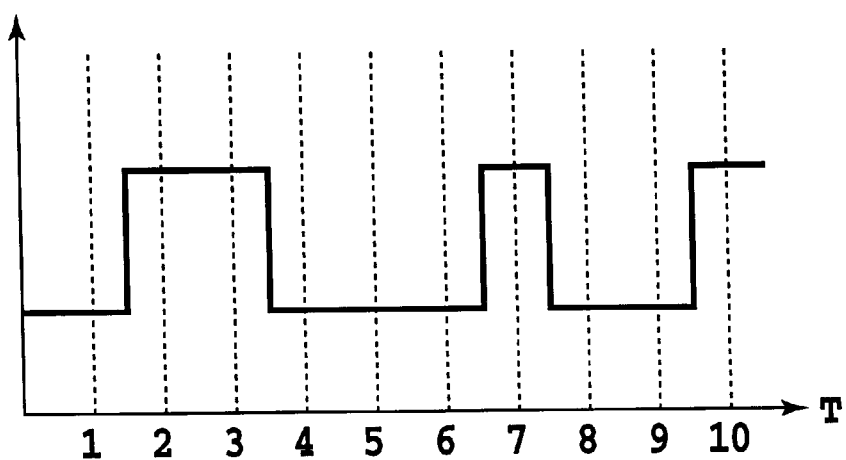
FIG. 4 is a waveform diagram showing the principle of detecting flickers in the first embodiment of the invention.

FIG. 3 shows a frame structure of an image (which may be read as a field structure: in that case the word "frame" in the following description shall be read as "field"). In the figure, blank circles and filled or solid circles represent image elements or pixels, and the video has a sampling structure in which sampling is performed in horizontal, vertical and time-axis directions. The luminance of a solid circle plotted in the time (t) direction is shown in FIG. 4. When the luminance or brightness changes from frame 1 (t=1) to frame 2 (t=2) and returns to the almost original level at frame 4 (t=4) as the frame shifts via frame 3 (t=3), one cycle of flicker is detected. When this luminance change and return to the almost original level occurs successively, it is decided that a flicker has occurred.

The luminance change can be represented simply by a frame difference. The frame difference $D_n(i,j)$ at a position $(i,j)$ in a frame n can be expressed as $$D_n(i,j) = A_n(i,j) - A_{n-1}(i,j) \tag{1}$$

where $A_n(i,j)$ is a luminance level at a position $(i,j)$ on an n-th frame, and $A_{n-1}(i,j)$ at the same position one frame before. Similarly, the frame difference on an (n−k)th frame is expressed as follows.

$$D_{n-k}(i,j) = A_{n-k}(i,j) - A_{n-k-1}(i,j) \tag{2}$$

When $D_n(i,j)$ and $D_{n-k}(i,j)$ have opposite signs, it can be interpreted that the luminance changed and returned to the almost original level k frames later. In this case, therefore, one cycle of flicker at the pixel (i,j) is detected. The necessary condition for the flicker occurrence is that there be many such pixels in the frame. An evaluation function of flicker is defined using a mathematical correlation function, as follows.

$$E_n = \frac{1}{N}\sum_i \sum_j D_n(i,j) D_{n-k}(i,j) \qquad (3)$$

Where N is a total number of pixels in the frame. Having a large negative value of the correlation function represents one cycle of flicker. When such a state of the function occurs successively over a length of time, it is decided that a flicker has occurred.

The field difference or frame difference plays an important role in the detection of flicker. The difference values should much go better with human senses. Suppose equal lumunance changes in magnitudes occur in a certain bright region and in a less bright region, humans are more sensitive to the lumunance change in the less bright region. Hence, the lumunance change is normalized by luminance level. For example, $$D_n(i,j) = \frac{A_n(i,j) - A_{n-1}(i,j)}{\max\{A_n(i,j), A_{n-1}(i,j), A_0\}} \times B \qquad (4)$$

where $A_0$ is a predetermined threshold value to prevent a possible deterioration of precision that can occur when a denominator and numerator becomes small, and B is a constant to adjust the dynamic range of a calculation circuit. When, for example, the luminance level is represented by 8 bits (0 to 255) and $D_n(i,j)$ by 8 bits (−128 to +127), it is appropriate to set $A_0$ to about 10% of the maximum luminance level, or $A_0$=20 to 25, and B is appropriately set at a value such that the equation (1) will not be clipped whatever values $A_n(i,j)$ and $A_{n-1}(i,j)$ may take, or B=128. In an actual hardware implemented, this portion is formed by a read-only memory (ROM) with a 16-bit input and an 8-bit output. Hence, there are many possible variations based on the field difference or frame difference.

The equation (3) for calculating the correlation has an evaluation value expressed in energy (electric power). Therefore, it has a drawback that it fails to react to a small amplitude of $D_n(i,j)$ and $D_{n-1}(i,j)$ but reacts sharply to a large amplitude. For this reason, in order to change the unit of evaluation value from energy to amplitude and to decide that one cycle of flicker is detected when the evaluation value is a large positive value, the evaluation function based on the correlation is modified as follows.

$$E_n = \frac{1}{N}\sum_i \sum_j f(D_n(i,j), D_{n-k}(i,j)) \qquad (5)$$

$$f(x,y) = \begin{cases} C\sqrt{(-xy)} & \text{if } (xy < 0) \\ 0 & \text{if } (xy \geq 0) \end{cases} \qquad (6)$$

where C is a constant to adjust the dynamic range of the output and is appropriately set at C=2 as the constant with which the output is not clipped when the two inputs are 8 bits (−128 to +127) and the output is 8 bits (0 to 255). This portion, too, may advantageously be formed by a read-only memory (ROM) with a 16-bit input and an 8-bit output. There are many possible variations.

In the above equations, k represents a delay time which elapses from the moment when the luminance level change occurs to the moment when it returns to the almost original level and is expressed as an integer multiple of the field or frame period. It should be noted that the delay time is not always constant. When, for example, the flicker frequency ranges from 3 Hz to 30 Hz, the value of k must cover all delays from one field to 10 fields. In another embodiment that follows, the correlation evaluation is calculated for all ks of 1 to 13 fields delay.

Figure 5:
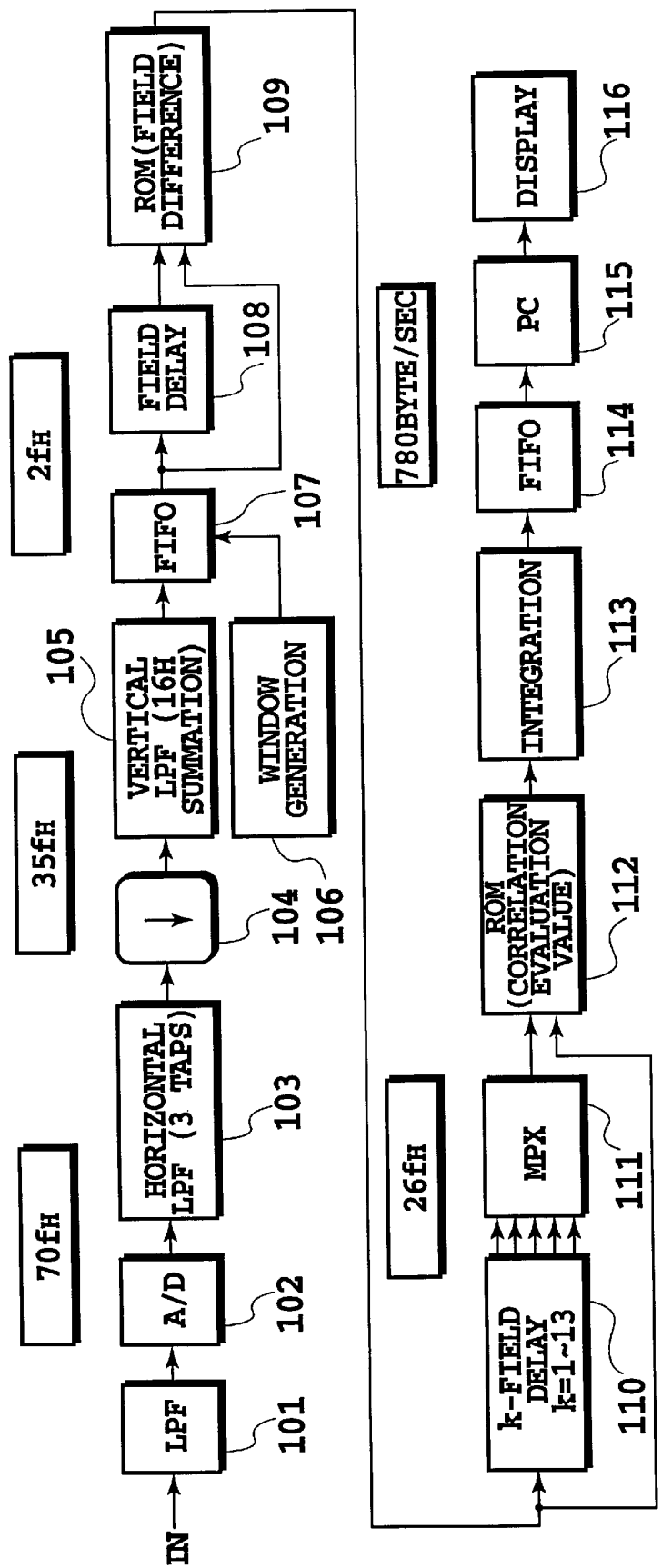
FIG. 5 is a block diagram showing an example configuration of a flicker detection section in the first embodiment of the invention.

FIG. 5 shows an example configuration of the flicker detection section 40 that uses the above flicker detection method. An input signal (IN) is an NTSC signal or a signal mixing three primary color signals (red, green, blue) from the VTR 10.

The input signal (IN) is passed through a low-pass filter (LPF) 101 before being digitized by an A/D converter 102. The flicker detection of the embodiment detects a large area flicker and may have a significantly low spatial resolution. For this reason, the clock frequency of the A/D converter 102 is set to 70 times as high as the line frequency ($f_H$). At this time, a sampling frequency is about 1.1 MHz, and the band of the LPF 101 is some 0.5 MHz. An input level of an 8-bit A/D converter 102 is adjusted so that a black peak of the input results in a digital level of 0 and a white peak results in a digital level of 255.

The output of the A/D converter 102 is passed through a simple horizontal LPF (tap coefficients: ¼, ½, ¼) 103, and the passed signal is sampled by a reduced sampling frequency (down-sampling) to half in the A/D converter 102, 35 $f_H$, in a sampling circuit 104. The down-sampled signal is passed through a vertical LPF 105 comprising a 16-line summation, and then the line number of the signal is reduced to one line for every ten (down-line). The down-line operation is controlled by a window generation (generator) 106, which at the same time eliminates the blanking period of the video. The window generation 106 generates a window for reducing the vertical effective line number to 21 lines per a field, with the horizontal effective pixels reduced to 25 pixels. During the window period, the video of 25 pixels×21 lines=525 samples/field is written into a first-in-first-out memory (FIFO) 107.

The signal written into the FIFO 107 is read out at the rate of 2 $f_H$ and sent to a field delay (circuit) 108. The output of the FIFO 107 and the output of the field delay 108 are converted by a read-only memory (ROM) 109 into values of the evaluation function based on field difference. Values to be output are stored in the ROM 109 in the form of a lookup table. The evaluation function, as described earlier, does not need to be a field difference but may be selected from among a variety of other possible forms of value, such as a value obtained by normalizing the field difference by luminance level. Conceivable variations of the evaluation function are shown in FIG. 6.

Figure 7:
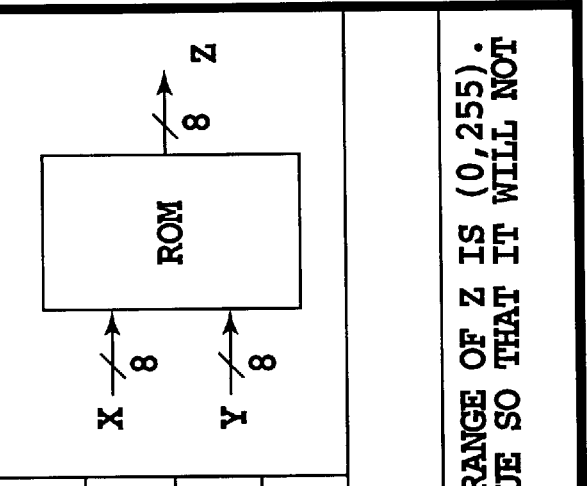
FIG. 7 is an explanatory diagram showing the contents of processing performed by ROM 112.

The value of the evaluation function based on the field difference is delayed by a k-field delay 110 (k=1 to 13), and an evaluated value of correlation between each delayed signal and the original signal is then output from a ROM 112. The term "correlation" as used normally in mathematics is defined as the sum of products of two signals, and the evaluated value of correlation is defined as a product of the delayed signal and the original signal. If, however, the evaluated value of correlation is defined as a product, the value is expressed in energy (electric power) and, as explained earlier, has the drawback of failing to react to the small frame difference. Here, the evaluated value of correlation is defined as follows. That is, when the delayed signal and the original signal have the same signs, a value 0 is output. When both signals have the opposite signs, a value of a square root of the product value attached with a minus sign (−) is output. Thus, the correlation evaluation value is output as a signal expressed in amplitudes rather than energy. There are other possible variations for the evaluation value as shown in FIG. 7 and a second evaluation function may advantageously be generated by the ROM 112. Values to be output are stored in the ROM 112 in the form of a lookup table.

The second correlation evaluation value is produced for each k of k field delays (k=1 to 13) and is integrated within each of the fields (525 blocks) for each k. The delays from the k-field delay 110 are each multiplexed by a multiplexing circuit 111 into a single signal to enable the correlation evaluation value to be generated and integrated for each delay by one circuit (an integration circuit 113), which in turn simplifies the configuration of the device.

The correlation evaluation value for each delay is taken into a personal computer (PC) 115 through FIFOs 114. Upon detecting that the correlation evaluation value exceeds a preset threshold value and this event occurs successively over a length of time, the PC 115 calculates the flicker frequency and a duration time of such an event. When the frequency and the duration time exceed the predetermined dangerous levels, the PC 115 issues to the control unit 60 a detection data indicating that there is a flicker in the video reproduced by the VTR 10. Any device that performs the above detection function can be used in addition to the PC 115. The PC 115 can also display the correlation evaluation value on a display device 116 such as an oscilloscope.

The luminance(brightness) in the above description does not need to be limited to a luminance(brightness) in the narrow sense of the word as used in the color optics and can be read as a signal level in a variety of video signals.

Of the videos that are edited by alternating two shots at short time intervals, some exhibit changes only in color but not in luminance level. A single device that uses the NTSC signal or luminance signal as an input signal cannot detect such a flicker in color level. To deal with this problem, a plurality of flicker detection sections with equal characteristics having the same system as FIG. 5 are prepared. Three color signals produced by mixing the three primary color signals at an appropriate mixture ratio are supplied to each of the flicker detection sections. Of these flicker detection sections, the one that has detected a largest flicker is allowed to produce an overall flicker output.

Figure 8:
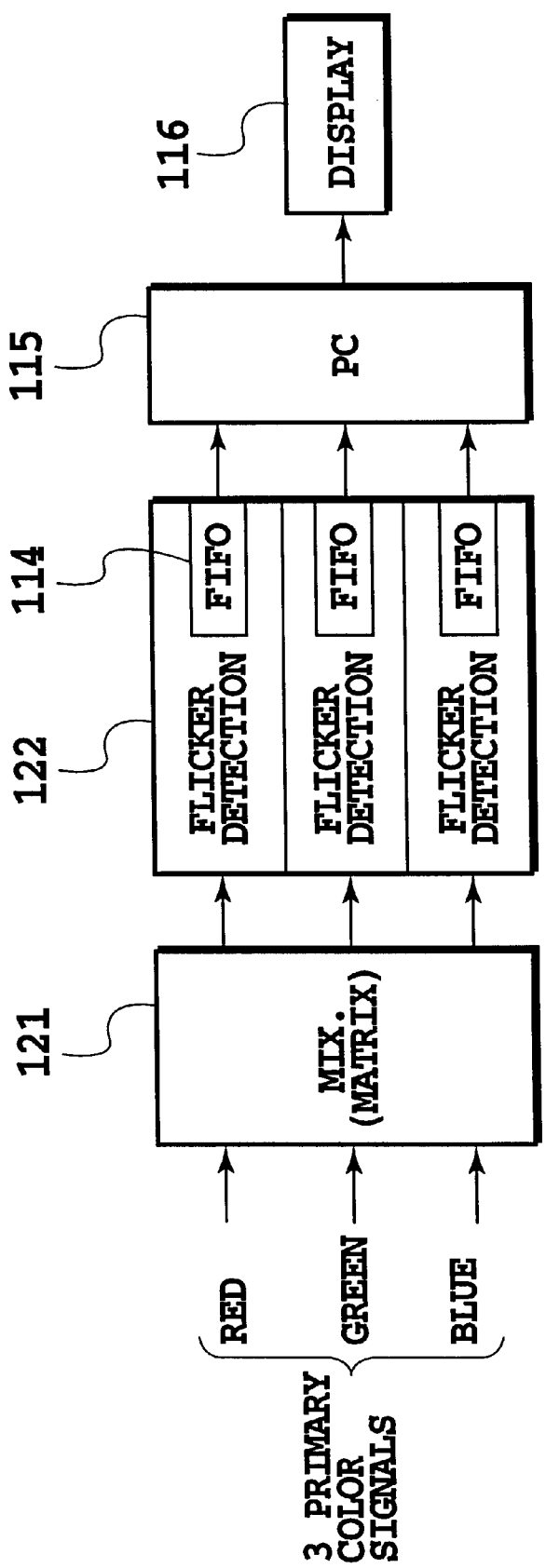
FIG. 8 is a block diagram showing an example variation of the flicker detection section in the first embodiment of the invention.
Figure 9A:
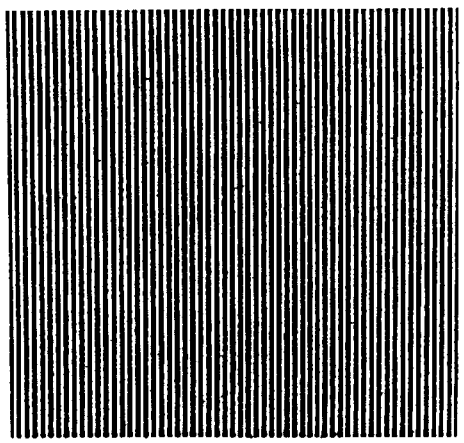
FIGS. 9A to 9D are explanatory views showing image patterns that may cause fits in viewers due to pattern-sensitivity.
Figure 9B:
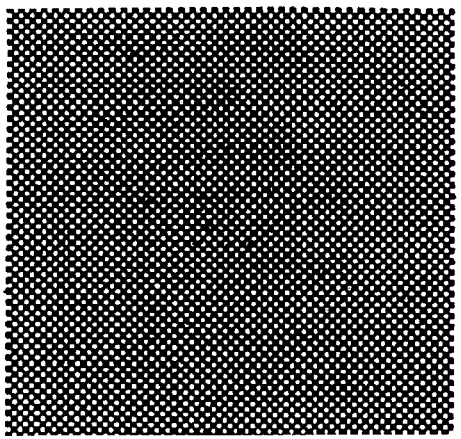
Figure 9C:
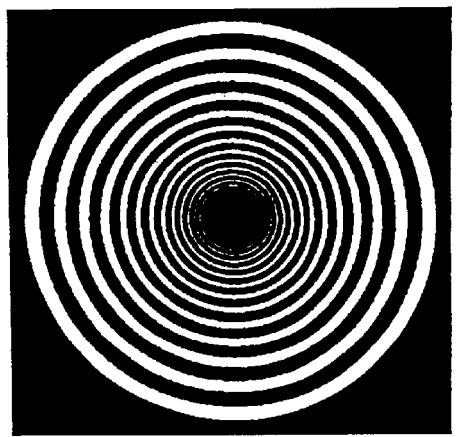
Figure 9D:
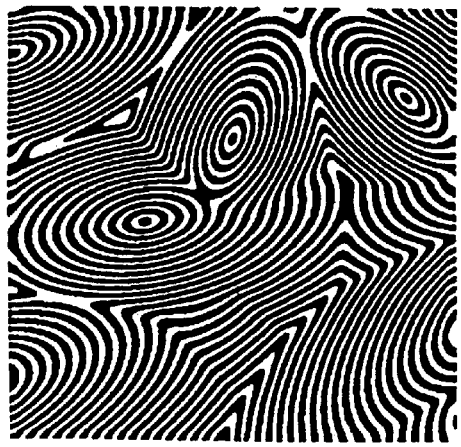

FIG. 8 shows a variation of the flicker detection section.

In FIG. 8, three primary color signals (red, green, blue) are mixed by a matrix 121 with appropriate weight coefficients (negative coefficients may also be used) and summing the multiplied results. The matrix used here does not need to be a matrix used for the NTSC encoder that generates YUV from RGB. When three flicker detection sections 122 are used, there is no problem with the use of three primary color signals such as RGB signals or YUV signals. When two flicker detection sections are used, however, it would be appropriate to use one section for a Y signal and the other for a magenta-cyan signal, for example, an R-B mixed signal. The flicker detected by two or three sections is taken into the PC 115 via the FIFOs 114 in FIG. 5. The PC 115 needs only to display the greatest flicker as an overall flicker detection signal. In the example of FIG. 8, therefore, two or three flicker detection sections of the same configurations are prepared and supplied with two or three signals, which are produced by mixing the three primary color signals at an appropriate mixture ratio, and the flicker detection section that has detected the largest flicker is allowed to produce its output as an overall flicker detection output of the two or three flicker detection sections.

The above flicker detection sections combine to reduce erroneous detection of flickers substantially compared with the device that examines only video changes. To identify periodicity in the video changes the mathematical correlation (or an evaluation function derived by transforming the correlation) between the field difference or frame difference and the corresponding field difference or frame difference with some delay is used. The flicker detection processing time can be reduced by reducing the sampling frequency and the number of lines of television video signals (down-sampling and down-line operations, respectively) and by calculating the field difference or frame difference and the mathematical correlation using a non-volatile memory. Further, the use of luminance signals and particular mixed color signals from the television video signals to be examined enables general flickers(in luminance) and flickers of a particular color to be detected.

Figure 10:
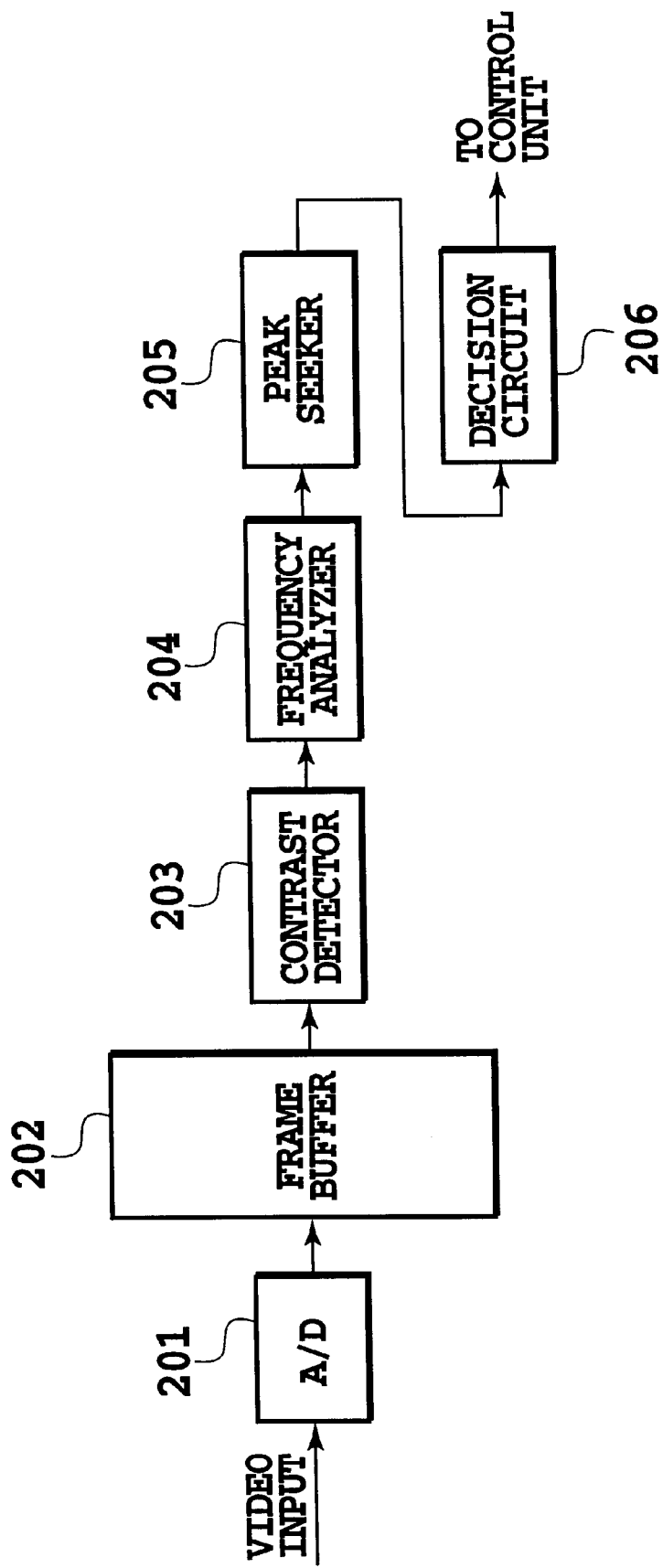
FIG. 10 is a block diagram showing a system configuration of a pattern detection section in the first embodiment of the invention.
Figure 11:
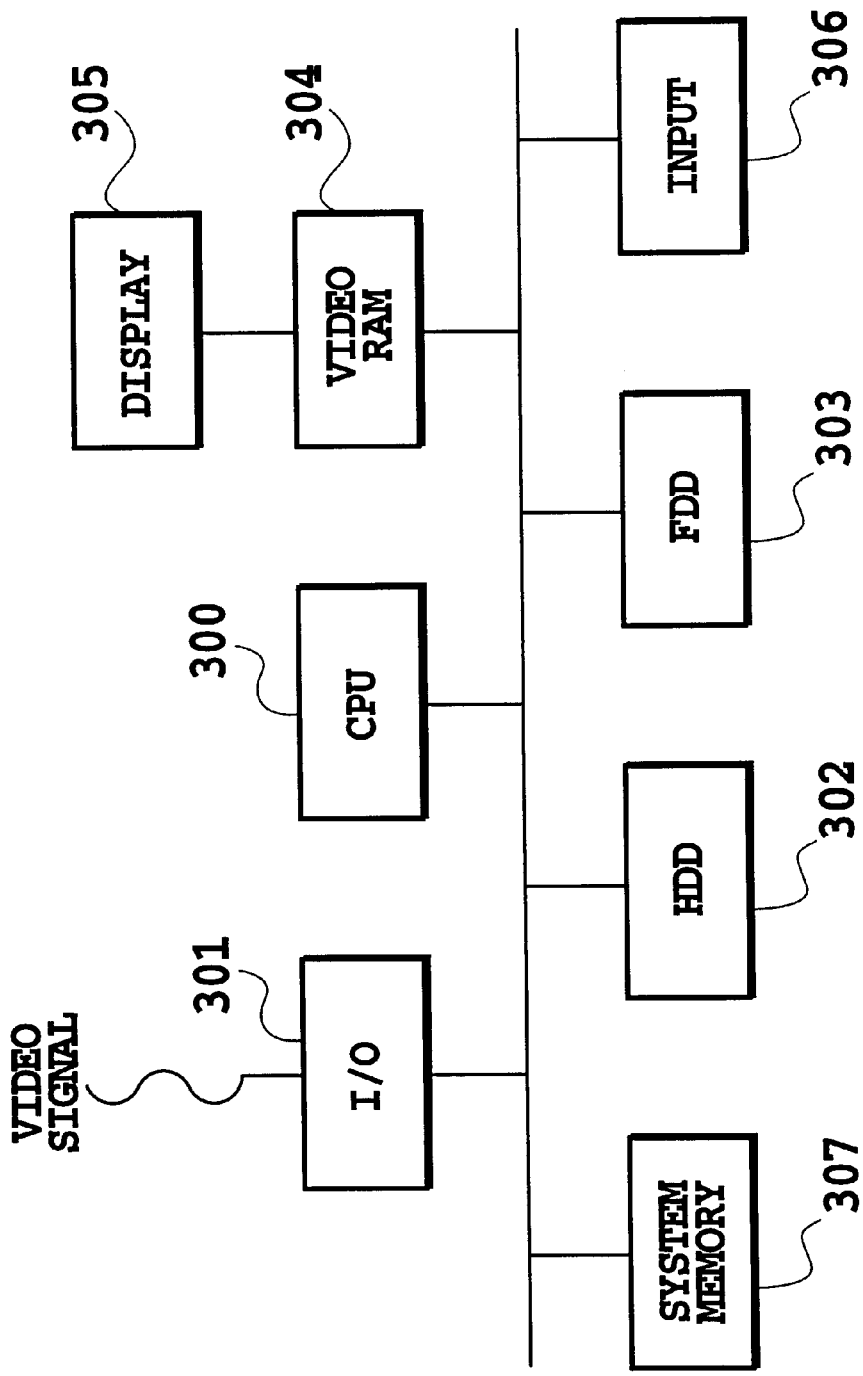
FIG. 11 is a block diagram showing a system configuration of an example variation of the pattern detection section in the first embodiment of the invention.

Next, the detection of particular patterns will be explained. It is known that images containing periodic patterns, such as striping, checker, concentric, radial, or swirl patterns having high contrast, may induce seizures when viewed by a photosensitive person. The pattern detection section 50 automatically detects, from the video, such images containing these particular patterns with high contrast, that may induce pattern-sensitive fits. The pattern detection section 50 can be implemented as shown in FIGS. 10 and 11.

Some examples of pattern forms to be detected in images are shown in FIG. 9. Reference numeral 91 shows a vertical stripe pattern. Reference numeral 92 shows a checker pattern. Reference numeral 93 shows a concentric pattern; and reference numeral 94 shows a whorl pattern. All of these patterns are locally periodic (repetitive) in at least one direction. The inventor(s) of the present invention have found that, when performing frequency analysis, for example, by the Fast Fourier Transformation (FFT), there is an acute peak in that portion at a particular spatial frequency (first condition). The inventors also have found that a high contrast image is characterized by large alternating current energy (second condition). Based on these findings, in this preferred embodiment, an entire image is divided into a plurality of small blocks, then it is determined whether the image in each block satisfies the two conditions described above. Thereafter the image will be judged to belong to the specified class of images if the ratio between the area occupied by the blocks satisfying both the first and second conditions as described above and the area of the entire image exceeds a predefined value.

A system architecture of the video inspection device using such video inspection method as described above is shown in FIG. 10. In FIG. 10, reference numeral 201 designates an analog/digital (A/D) converter for analog to digital conversion. Reference numeral 202 designates a frame buffer for temporary storage of one screenful (frame) of image data (brightness data in this embodiment). Reference numeral 203 designates a contrast detector for analyzing the image data to determine whether or not its contrast is within an allowable tolerance range.

Reference numeral 204 designates a frequency analyzer, which analyzes frequency within each divided block according to the image data stored in the frame buffer 202 if the result from contrast detector 203 is out of range. Reference numeral 205 designates a peak seeker, which determines whether or not the peak indicated by the frequency analysis results of each block falls within a predefined frequency band, characterizing the class of image patterns to be detected. Reference numeral 206 designates a decision circuit for summing, based on the results of each block obtained from the peak seeker 205, the area (or the number) of blocks containing an acute peak (blocks determined by the peak seeker 205 in which the peak value is within a predefined frequency range) to compute the ratio between the summed area and the screen size (or the ratio between the number of blocks having a peak and the total number of blocks constituting the full-screen image). If this ratio is out of range, the image represented by the image data in the frame buffer 202 is determined to belong to the class of images to be detected.

The detection of specific types of image pattern carried out by the above system will be now described hereinbelow in greater detail.

Video signals are inputted from the VTR 10 to the device through a video input means such as a connector (not shown) in the form of analog signals comprised of frames of images, such as NTSC signals. The A/D converter 201 converts from analog input video signals to digital video signals to input to the frame buffer 202. In this embodiment an entire image (frame) is divided into small blocks of M (in the abscissa axis direction) by N (in the ordinate axis direction). Thereafter the blocks are processed one by one, and the next frame will be captured at the time when all processing on every block in one frame is complete.

In contrast detector 203, the variance $\sigma^2$ of brightness of all pixels (picture elements) in one small block is determined by using the following expression:

$$\sigma^2 = \sum_{ij} I_{ij}^2 / N - \left\{ \sum_{ij} I_{ij} / N \right\}^2 \tag{7}$$

wherein $I_{ij}$ refers to the brightness of a pixel located in the position (i,j) in that block. This corresponds to the total energy of alternating current components of the image in that block. If this value exceeds a predefined threshold value $\theta 1$, i.e., if this value is out of allowable tolerance range, then the contrast detector 203 determines that this small block is a high contrast block, and sends the image data for that block to the succeeding stage, the frequency analyzer 204.

As another means for accomplishing the functionality of the contrast detector 203, the sum of edge intensities obtained by passing through a differential filter such as a sobel filter may be divided by the number of pixels constituting edges to obtain an "average edge intensity" to compare with a threshold.

In the frequency analyzer 204, the image data transferred from the contrast detector 203 is subjected to a Fourier transform which resolves it into spatial frequency components in order to derive an energy for each spatial frequency.

The result $F_{\mu\nu}$ of the Fourier transform of the image data of each block is comprised of a real number part $R\{F_{\mu\nu}\}$ and an imaginary number part $I\{F_{\mu\nu}\}$, where $\mu$ and $\nu$ indicate spatial frequencies in the horizontal direction and the vertical direction, respectively.

The energy $E_{\mu\nu}$ of each frequency component may be expressed as follows:

$$E_{\mu\nu} = (R\{F_{\mu\nu}\})^2 + (I\{F_{\mu\nu}\})^2 \tag{8}$$

In the peak seeker 205, the spatial frequency spectrum in each respective block is examined to determine whether or not it contains an acute peak in the predefined frequency range f1–f2. A peak is defined to be acute if it satisfies either or both of the following conditions:

1. a maximum value other than for the direct current component is detected in a block, and the value thereof exceeds a predefined value $\theta 2$ with respect to the total alternating current energy in that block; and/or
2. a maximum value exceeds a predefined value $\theta 3$ when adding values of eight neighbor components surrounding the one having the maximum, even though the maximum detected in that block does not satisfy condition (1) above.

In decision circuit 206, the total area of the blocks having an acute peak is determined. If the ratio between the total area of these blocks and the area of the complete image (frame) exceeds a predefined threshold value $\theta 4$, then that image is determined to be an image containing one of the class of respective patterns to be identified (pattern forms exemplified in FIG. 9).

The results of the decision circuit 206, i.e., whether an image pattern of the class to be identified has been detected, are supplied to the control unit 60 as the detection data.

In the frequency analyzer 204, if an original image is shrunk to ½, ¼, ⅛, . . . and Fourier Transform is applied thereon, the spatial frequency range which may be inspected is changeable. Furthermore, the Fourier Transform can be processed in a shorter time because of the reduced amount of image data to be processed. For the frequency analysis, image analyzing methods such as Wavelet Transform, Multiple Resolution Fourier Transform, or Hough Transform may be used instead of the Fourier Transform.

The thresholds $\theta 1$, $\theta 2$, $\theta 3$, $\theta 4$, f1 and f2 as mentioned above may be fixed. Alternatively, conditions for the pattern detection, such as the contrast intensity for example may be set adjustably by manually entering parameter data from an input device (not shown) such as a numeric keypad.

FIG. 11 represents a variation of the pattern detection section shown in FIG. 10, implemented by an image processing device. Well known information processing devices such as personal computers can be used for the image processing device. The software program (see FIG. 12) for video inspection of the image processing device is written in a language readable by a computer, and installed to the image processing device via a recording medium such as floppy diskette or CD-ROM.

In FIG. 11, a CPU 300, an interface (I/O) 301, a hard disk drive. (HDD) 302, a floppy diskette drive (FDD) 303, a video RAM 304, an input device 306, and a system memory 307 are connected to a bus. The CPU 300 controls the entire system, under the control of the operating system (OS) stored in the system memory 307 and hard disk drive 302. The interface 301 is also known as a graphics board, which sequentially captures video signals in the form of NTSC standard on frame-by-frame basis, to convert to digital signals that the CPU 300 can process.

The hard disk drive 302 stores, in addition to the operating system, some software programs for video inspection according to the present invention, and some software programs for creating and editing moving pictures.

The floppy diskette drive 303 accepts a floppy diskette, and reads software program stored thereon for video inspection as mentioned above under the control of the CPU 300. The video RAM 304 stores one frame of image data. Writing image data into video RAM 304 is performed by the CPU 300, image data will be read out therefrom by a controller (not shown) in a display 305 for display on the screen of the display 305.

The input device 306 includes a mouse and a keyboard. The input device 306 is used for inputting various commands to the CPU 300 and miscellaneous information for execution of the software programs.

The system memory 307 includes ROM and RAM. The system memory 307 is used as storage for storing part of the OS, as well as working space for storing data required by the OS and software programs, and storage of programs executed by the CPU 300.

Figure 12:
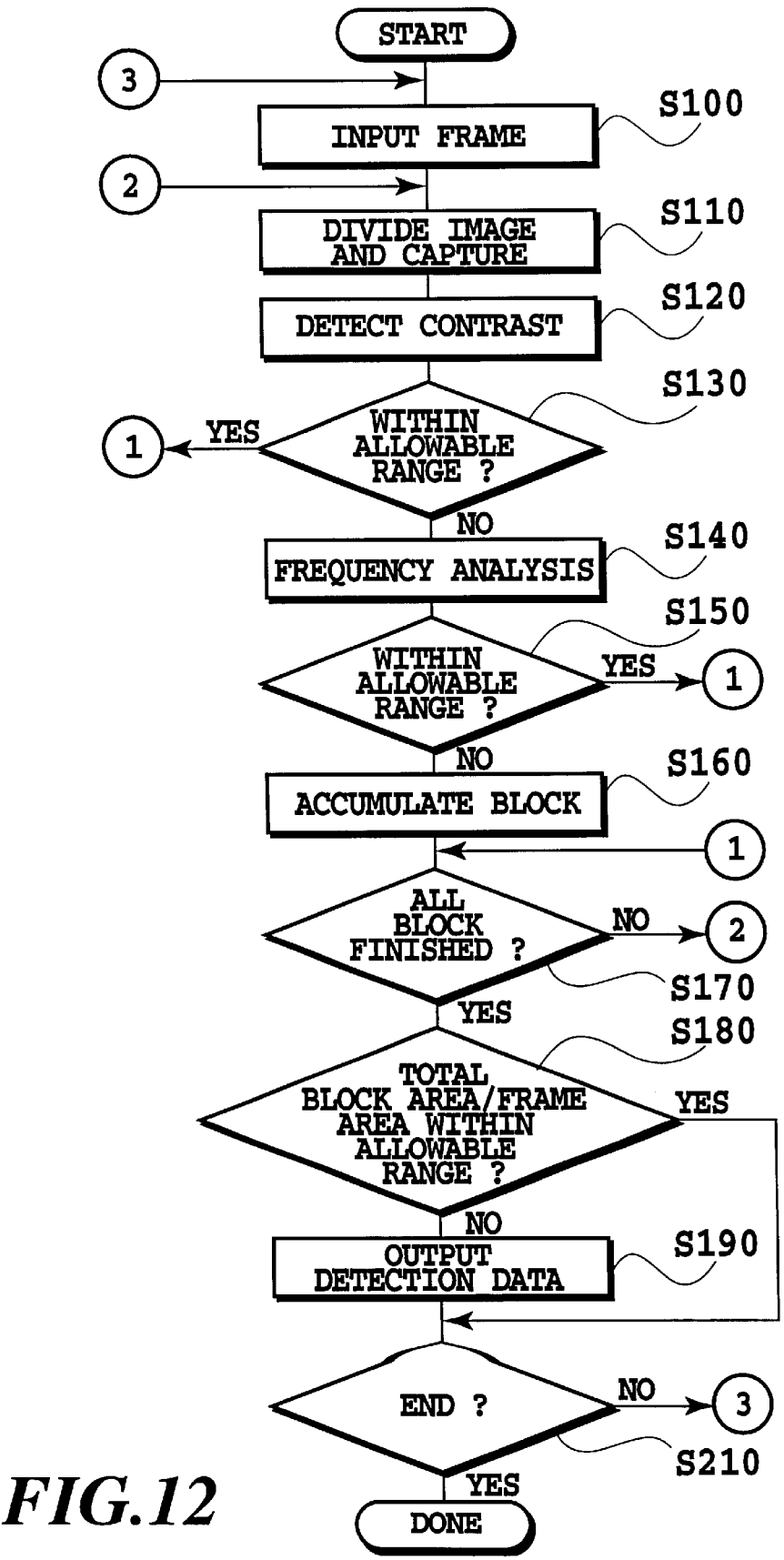
FIG. 12 is a flow chart showing a sequence of processing steps performed by the variation of the pattern detection section in the first embodiment of the invention.

The video inspection process executed in this system arrangement will be now described below in greater detail, with reference to FIG. 12. The process shown in FIG. 12 is written in a programming language executable by the CPU 300 and installed in the hard disk drive 302. By instructing through the input device 306, the process is loaded into the system memory 307 and executed by the CPU 300. For the purpose of explanation of the embodiment, the software program which is shown in FIG. 12 is decomposed into several process routines known in the prior art. It is to be noted that one of those skilled in the art will be able to write such a software program with or without exact source codes written in a particular programming language.

When instructed via the input device 306 to start the execution of the process shown in FIG. 12, the CPU 300 captures a frame image (one screenful image data) from the I/O 301 to write into the system memory 307 (step S100).

Then the CPU 300 divides the frame image stored in the system memory 307 into, for example, eight blocks. The CPU 300 picks up first block of the image data to compute the contrast intensity according to expression (7). It is determined whether or not the contrast intensity is within an allowable tolerance range (step S130). If the contrast is out of range, the process proceeds from step S130 to step S140 to perform frequency analysis.

If the contrast falls within the range, the process proceeds from step S130 through S170 to S110 to perform contrast computation of second block.

In frequency analysis in step S140, first block of image data is used for frequency analysis. It is determined whether or not the peak energy value obtained from expression (8) falls into the frequency range (tolerance range) indicative of the class of image patterns exemplified in FIG. 9.

If the peak falls within the range, then the process proceeds from step S150 through S170 to S110 to perform contrast computation of the second block. If not, the frame being inspected is determined to contain part of one of the class of image patterns exemplified in FIG. 9. Then the area of the first block is stored in the system memory 307 for accumulation (summation) of areas (step S160).

Next, the process proceeds from step S170 to S110 to perform contrast inspection and frequency inspection of the second block. If the second block is determined to be out of range in both inspections, the area is accumulated. Then the process repeats those steps of video inspection for all remaining blocks (YES decision in step S170), the CPU 300 computes the ratio between the accumulated surface area and the frame area to determine whether the ratio falls within a tolerance range (step S180). If the ratio is out of range, i.e., frame subject to be inspected is determined to contain any of the class of image patterns exemplified in FIG. 9, the CPU 300 outputs the detection data from an output device (not shown) to the control unit 60 and the processing proceeds to step S210. If the frame image being inspected is determined not to contain any one of the class of image patterns exemplified in FIG. 9 (i.e., YES decision in step S180), a loop processing of step S210 to decide whether or not the above processing should be repeated until the video ends is performed, and the processing outputs the detection data automatically whenever there is a possibility that a video (moving pictures) consisting of a plurality of frames (still images) may cause a pattern-sensitive fit.

As described above, the special part detection device 30 inspects the characteristics of the reproduced video sent from the VTR 10 to automatically perform detection of various special parts, such as detection of flawed video parts caused by tape scratches, detection of flickers that may cause photo-sensitive fits, and detection of particular patterns that may cause pattern-sensitive fits. Upon detection of these special parts, the special part detection device 30 outputs the corresponding detection data.

Figure 13:
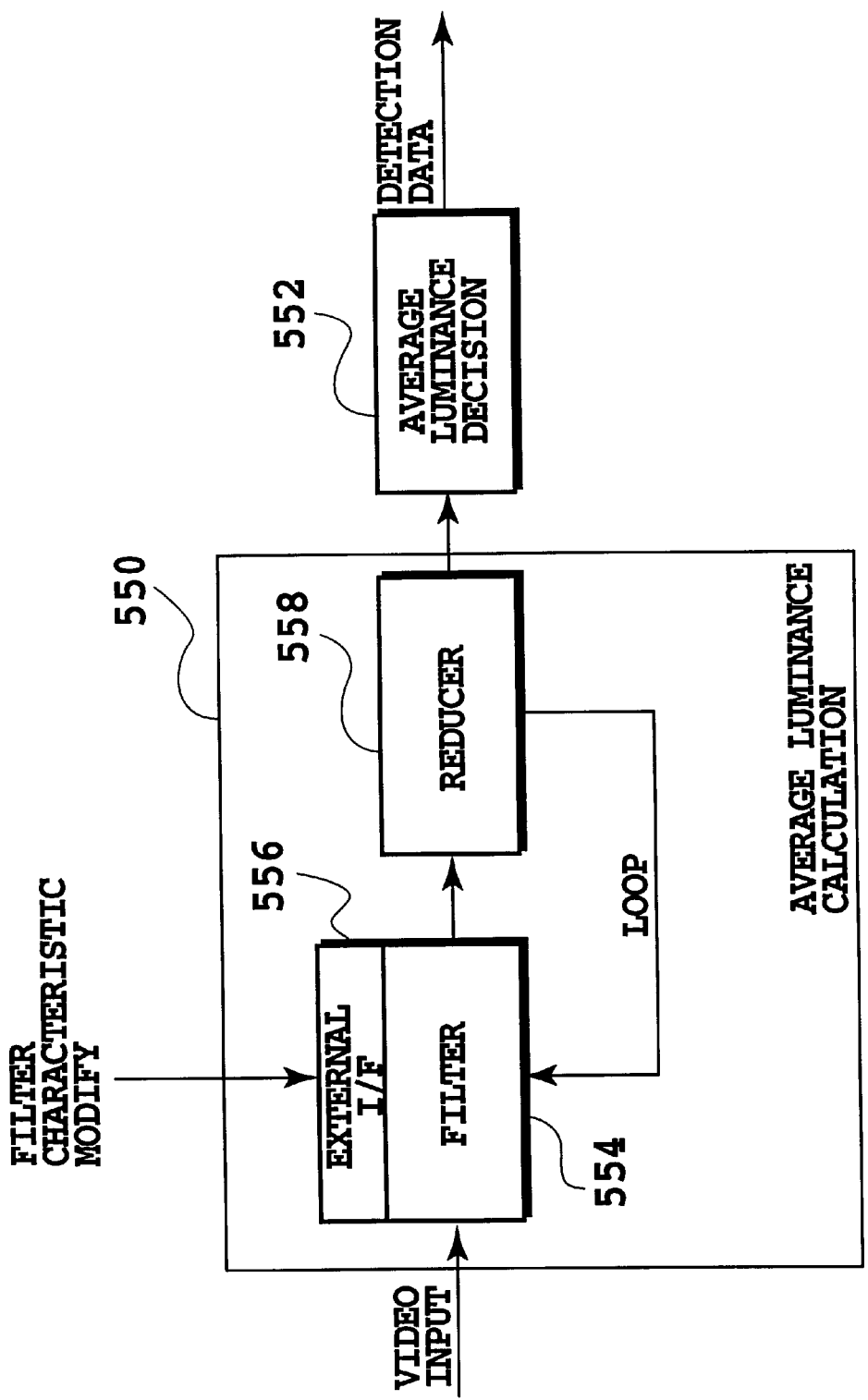
FIG. 13 is a block diagram showing a configuration of an average luminance calculation and detection section in the first embodiment of the invention.

The average luminance calculation/detection section 55 shown in FIG. 13 calculates an average luminance for each input frame or field and checks for any change in average luminance spanning a plurality of frames or fields to detect the special parts in the video.

The average luminance calculation/detection section 55 comprises an average luminance calculation circuit 550 and an average luminance decision circuit 552. A video signal is input to a filter section 554 in the calculation circuit 550, where it is subjected to filtering processing with a desired characteristic for each frame or field. The filter characteristic can be modified arbitrarily through an external I/F 556. The filtered video signal is reduced to a required level of resolution by a reducer 558. With a simple configuration that uses the filter 554 and reducer 558 recursively as shown, the calculation circuit 550 can calculate the average luminance for each frame or field, and outputs to the average luminance decision circuit 552.

The decision circuit 552 makes a variety of decisions on, for example, a change level in average luminance per unit time, the number of times that the change has occurred, and the frequency of the changes, and, depending on the results of the decisions, outputs detection data on the special parts.

Returning to FIGS. 1 and 2, the control performed by the control unit 60 will be described in detail.

During a replay and search operation by the VTR 10 (see FIG. 1), time codes (information on absolute positions on the tape) are transferred to the control unit 60. When the special part detection device 30 sends the detection data to the control unit 60 on searching through the reproduced video, the control section 66 controls the display device 72 and video monitor 20 to display an indication of the special parts being detected and the time codes found and transferred at detection time. The video monitor 20 displays the sign and codes information superimposed on the reproduced video. The detection data is written into the memory 70 along with the corresponding time codes.

Hence, the above replay and search operation allows the memory 70 to store the contents of the special parts detected from the reproduced video (tape scratch, flicker, special pattern or change of average luminance, and the levels of these) and the time codes found and transferred at detection time. If the memory 70 is nonvolatile such as NVRAM, the stored information remains intact even after the device power is turned off.

During reproductions by the VTR 10 subsequent to the replay and search operation, or reproductions through dubbing (see FIG. 2), the control unit 60 is connected with another video tape recorder 12 to transfer the reproduced video signals between the VTR 10 and VTR 12. Under control of the control unit 60, the stored detection data is retrieved from the memory 70 and the information (the contents of the detected special parts and the time codes) are displayed on the display device 72. Then the operator, based on the information of the display, can specify parts to be reproduced and parts to be cut out to the control unit 60 through the user interface 90. The control section 66, based on the time codes for the specified parts, generates control signals to control replaying by the VTR 10 and sends them out via the RS422.

Thus, the above method allows desired parts of the tape loaded in the VTR 10 to be replayed automatically according to the time codes representing the absolute positions on the tape and only the reproduced video signals to be input and recorded onto the VTR 12. This results in an enhanced efficiency of the editing which involves eliminating the specified special parts. If the VTR 12 is also provided with a control function compatible with the RS422, more efficient editing can be performed.

(Second Embodiment)

Figure 14:
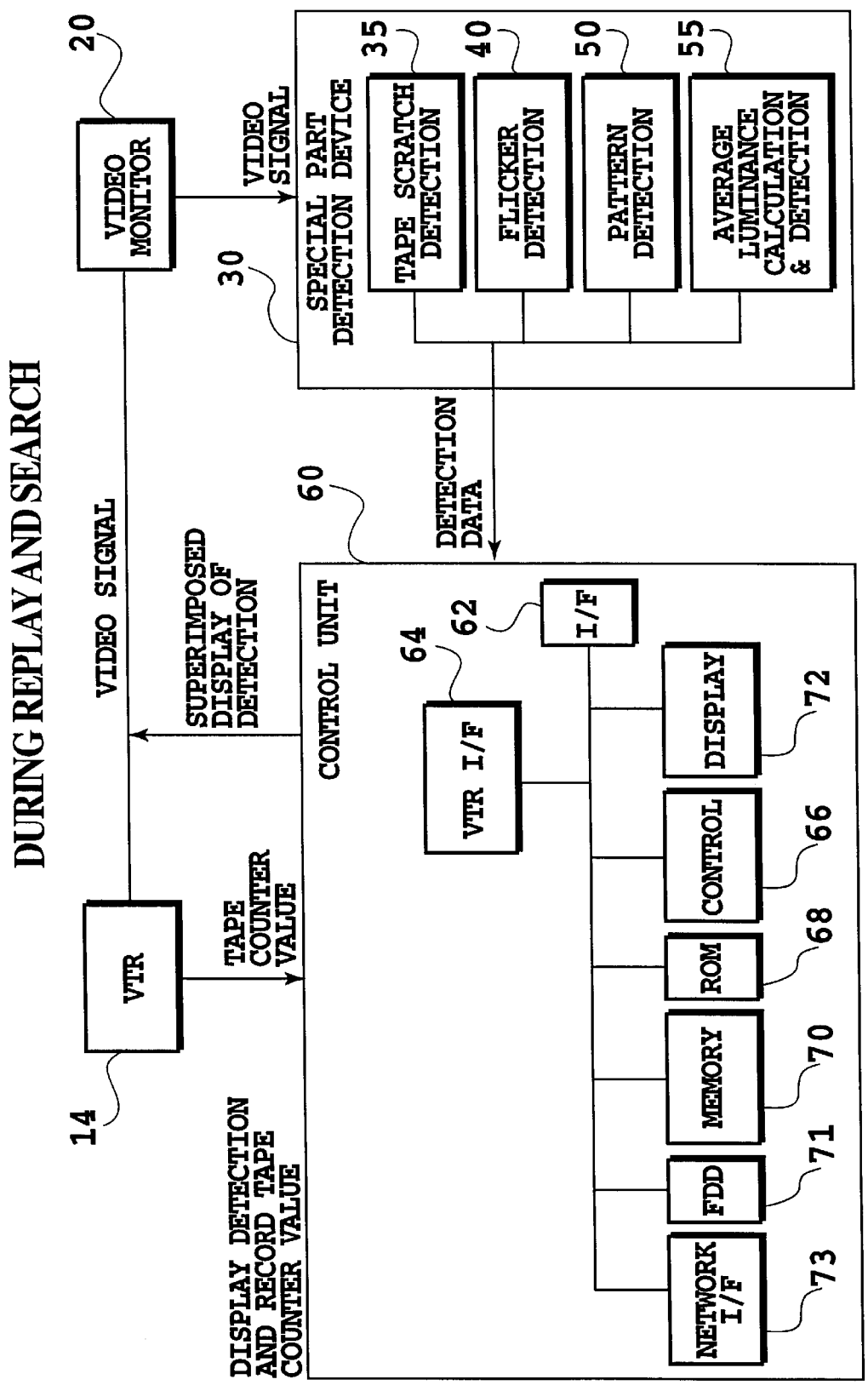
FIG. 14 is a block diagram showing a configuration of a video reproduction controller of a second embodiment of the invention when it is detecting special parts.
Figure 15:
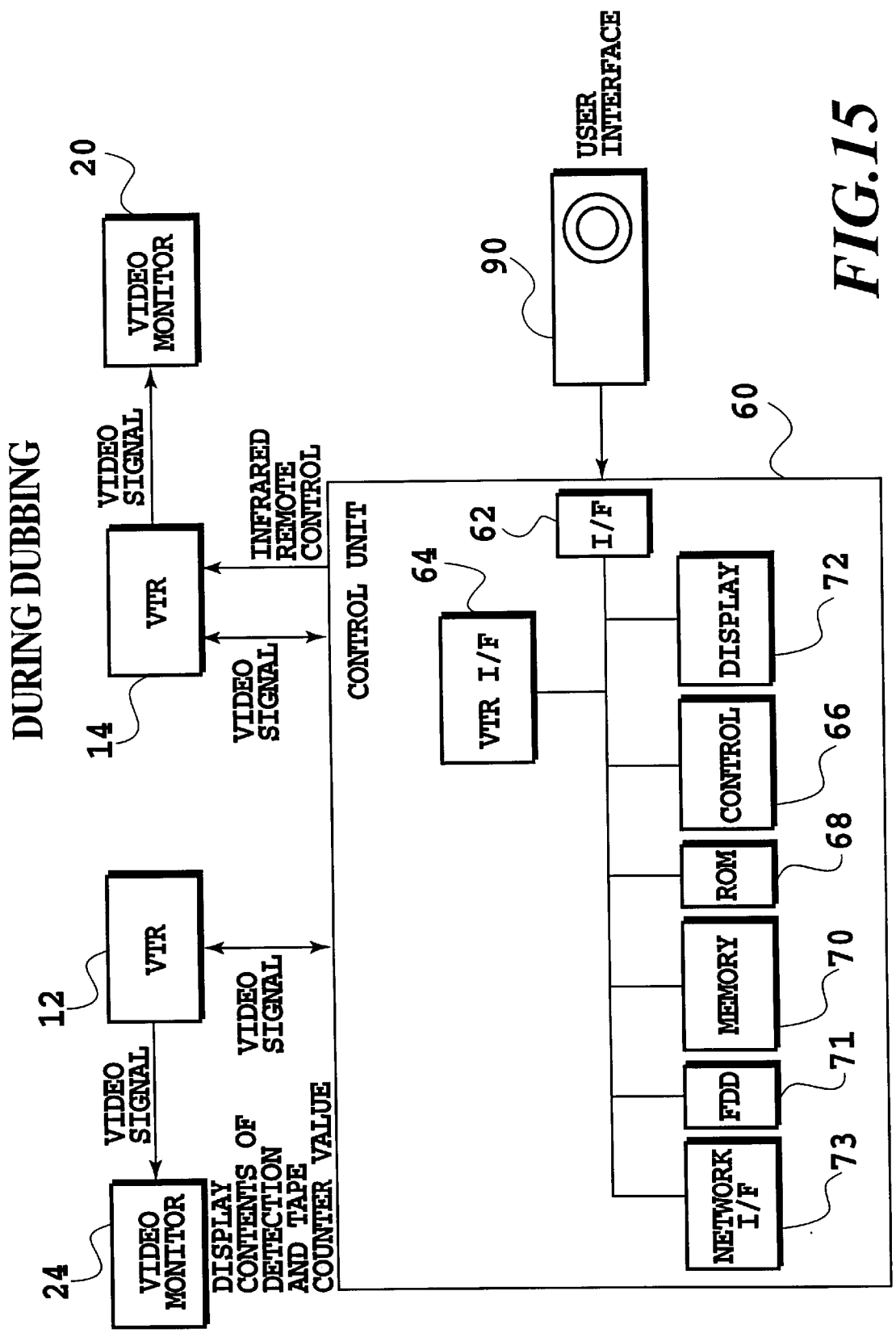
FIG. 15 is a block diagram showing a configuration of the video reproduction controller of the second embodiment of the invention when it is performing editing.

FIGS. 14 and 15 are block diagrams illustrating the video reproduction controller as the second embodiment of the invention, FIG. 14 representing the configuration during detection of special parts and FIG. 15 the configuration during editing.

In these figures, a VTR 14 is removed of the time code recording/reproducing function and the RS422, both provided in the VTR 10 of FIG. 1, and provided with a tape counter value outputting function and an infrared remote control function. This tape counter value, as is known, represents information on the tape position from a known reference position such as tape start position or counter reset position. Other constitutional elements in the FIGS. 14 and 15 are identical with those of FIGS. 1 and 2, and their explanations are therefore omitted here.

During the replay and search operation by the VTR 14 (see FIG. 14), the tape counter values (information on relative positions on the tape) are transferred to the control unit 60. When the special part detection device 30 sends the detection data to the control unit 60 on searching through the reproduced video, the control section 66 controls the display device 72 and video monitor 20 to display the indication of the special parts being detected and the tape counter values found and transferred at detection time. The video monitor 20 displays the sign and values superimposed on the reproduced video. The detection data is written into the memory 70 along with the corresponding tape counter values.

Hence, the above replay and search operation allows the memory 70 to store the contents of the special parts detected from the reproduced video (tape scratch, flicker, special pattern or change of average luminance, and the levels of these) and the tape counter values found and transferred at detection time. If the memory 70 is nonvolatile such as NVRAM, the stored information remains intact even after the device power is turned off.

During reproductions by the VTR 14 subsequent to the replay and search operation, or reproductions through dubbing (see FIG. 15), the control unit 60 is connected with the other video tape recorder 12 to transfer the reproduced video signals between the VTR 12 and VTR 14. Under control of the control unit 60, the stored detection data is retrieved from the memory 70 and the information (the contents of the detected special parts and the tape counter values) are displayed on the display device 72. Then the operator, based on the information of the display, can specify parts to be reproduced and parts to be cut out to the control unit 60 through the user interface 90. The control section 66, based on the tape counter values for the specified parts, controls replaying by the VTR 14.

In the execution of this reproduction control, generating known standard infrared remote control codes and sending them to the VTR 14 enables arbitrary control on the replay positions even with a video tape recorder for private use without an external control function through the RS422. Further, the reproduction control can also be performed by using a video tape recorder with an external control function compatible with the IEEE1394.

This control method allows desired parts of the tape loaded in the VTR 14 to be replayed automatically according to the tape counter values representing the relative positions on the tape and only the reproduced video signals to be input and recorded onto the VTR 12, offering the advantage of being able to enhance the efficiency of the editing which involves cutting out the specified special parts.

A control signal of the VTR 14 (for the control of tape driving) may also be used as the information representing the relative positions on the tape. If the control signal is simply a pulse train, the number of pulses counted by a counter means can be used as the position information.

(Third Embodiment)

Figure 16:
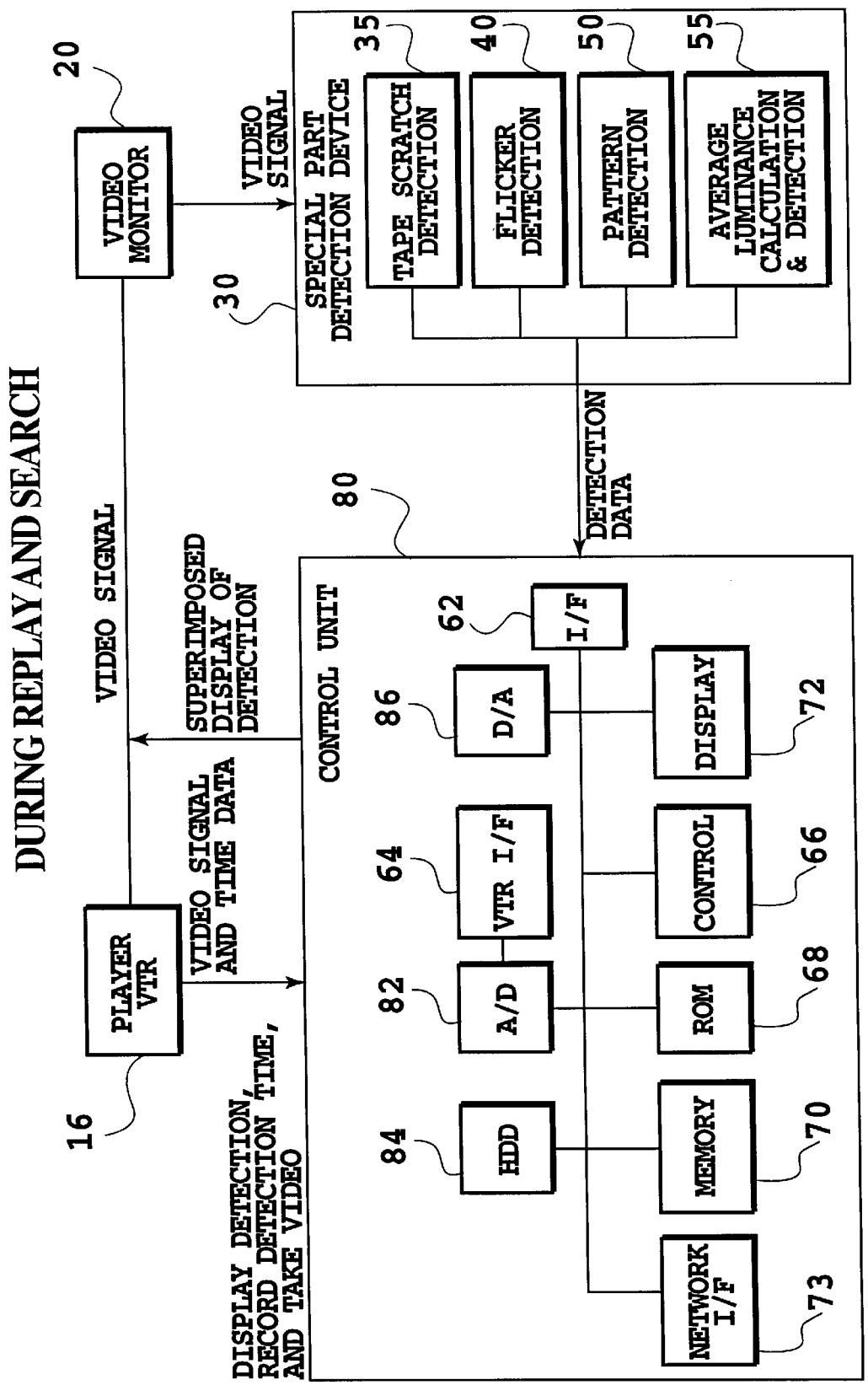
FIG. 16 is a block diagram showing a configuration of a video reproduction controller of a third embodiment of the invention when it is detecting special parts.

FIGS. 16 and 17 are block diagrams showing the video reproduction controller as the third embodiment of the invention, FIG. 16 representing the configuration during detection of special parts and FIG. 17 the configuration during editing.

In these figures, a VTR 16 may be equal in function to the VTR 10 of FIG. 1 or the VTR 14 of FIG. 14. Here the VTR 16 is assumed to be an analog type that outputs information on the absolute positions or relative positions on the tape as a detection time information. A control unit 80 has an A/D converter 82 and a hard drive (HDD) 84 in addition to the constitutional elements of the control unit 60 of FIG. 14. The A/D converter 82 converts reproduced video signals from the VTR 16 into digital form, which is then written into the HDD 84. Other constitutional elements except for a digital video tape recorder 18 are identical with those of FIGS. 1 and 2 and their explanations are omitted here.

During the replay and search operation by the VTR 16 (see FIG. 16), the detection time information (information on the absolute positions or relative positions on the tape) is transferred to the control unit 80. When the special part detection device 30 sends the detection data to the control unit 80 on searching through the reproduced video, the control section 66 controls the display device 72 and video monitor 20 to display the indication of the special parts being detected and the detection time information found and transferred at detection time. The video monitor 20 displays these information superimposed on the reproduced video. The detection data is written into the memory 70 along with the corresponding detection time information. Further, while the special parts are searched, the reproduced video by the VTR 16 is taken in and A/D-converted so as to be written into the HDD 84.

Hence, the above replay and search operation allows the memory 70 to store the contents of the special parts detected from the reproduced video (tape scratch, flicker, special pattern or change of average luminance, and the levels of these) and the detection time information. If the memory 70 is nonvolatile such as NVRAM, the stored information remains intact even after the device power is turned off. Further, the HDD 84 stores reproduced video in the form of digital data.

During a reproduction through dubbing, as shown in FIG. 17, a reproduction by using the VTR 16 is not performed but instead the retrieving from the HDD 84 is controlled. The control unit 80 is connected with a digital video tape recorder 18 to transfer the digital data between the HDD 84 and VTR 18. Under control of the control unit 80, the stored detection data is retrieved from the memory 70 and the information (the contents of the detected special parts and the detection time information) are displayed on the display device 72. Then the operator, based on the information of the display, can specify parts to be reproduced and parts to be cut out to the control unit 80 through the user interface 90. The control section 66, based on the detection time information of the specified parts, generates commands to controle retrieving the reproduced video from the HDD 84. The specified parts of the video are then arbitrarily read out according to the control commands.

Hence, by using the detection time information representing the absolute positions or relative positions on the tape, the embodiment can automatically read out only the desired part of video data from the HDD 84, convert the video data read out into digital form, and input the converted digital data onto the VTR 18 for recording. This method ensures efficient editing, which involves cutting out the specified special parts, without performing the control on the dubbing operation of the VTR 16. Thus, the control unit 80 needs no control function of the VTR 16.

While the VTR 16 is an analog video tape recorder, it may also be of a digital type. In that case, the A/D converter 80 is not necessary. The VTR 18, which is of a digital type tape recorder in the embodiment, may also be of an analog type, in which case the data retrieved from the HDD 84 shall be D/A-converted for further processing. While in the above embodiments the function of the control unit has been described for the example configurations including the CPU and the memory devices such as RAM, any other configurations may be employed as long as the control unit can store the position information and the detection data in memory during the replay and search operation and can control the VTR, during the dubbing operation, to replay any desired position of the tape based on specified position informations according to displayed data.

According to the video reproduction controller of the invention as described above, the position information about a recording medium, when the special parts are detected by reproducing the video data, is stored in memory devices on the recording medium and, during editing, is retrieved from the memory devices and displayed showing the recorded positions on the medium of the special parts. Desired positions to replay on the recording medium are then specified from outside based on the displayed position information. In response to the specified replay positions, the controller generates control signals which in turn automatically control the video reproducing device so that the video reproducing device will not reproduce the special parts on the recording medium, thus offering the advantage of being able to eliminate the complexity of the editing work, which involves cutting out the special parts.

Further, with the storage medium of the invention, the position information of the special parts stored in the above editing device can also be used in other devices. Hence, using the special parts' position information, together with the recording medium to be replayed by the video reproducing device, facilitates the utilization of the information.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed:

1. A video reproduction controller comprising:
   an input means for inputting, from a video reproducing device, a position information about a recording medium when a special part is detected by reproducing a video information of a recorded video for producing a broadcasting program on said recording medium of said video reproducing device for editing said recorded video, said special part comprising flickers and/or an image having an entire image area which includes a specified image area, a ratio of the specified image area to the entire image area being beyond a first predetermined value, the specified image area being that portion of the entire image area having contrast and frequency range of spatial frequency peak value beyond a second predetermined value;

a storage means for storing said position information;

a display means for retrieving said position information from said storage means and displaying position where said special part detected is recorded on said recording medium;

a specification means for specifying from outside replay position on said recording medium; and a control means for generating control signals to control replaying of said video reproducing device based on said position information corresponding to said specified replay position.

2. A video reproduction controller according to claim 1, wherein said input means further inputs detection data on said special part of said video information, said storage means further stores said detection data, and said display means further displays a content of said special part detected based on said detection data.

3. A video reproduction controller according to claim 1, further comprising:

a video storage means for inputting said video information on said recording medium replayed by said video reproducing device and storing said video information as digital data; and a read means for retrieving said digital data from said video storage means based on said position information corresponding to said replay position specified by said specification means and performing control to reproduce desired position of said video information.

4. A video reproduction controller according to claim 1, further comprising:

a detection means for detecting said special part from said video information reproduced by said video reproducing device;

wherein said input means inputs, when said detection means detects said special part and outputs said detection data, said position information on said recording medium from said video reproducing device, or said detection data from said detection means.

5. A video reproduction controller according to claim 4, wherein said detection means detects a special pattern in said video information as said special part.

6. A video reproduction controller according to claim 4, wherein said detection means detects a flicker in said video information as said special part.

7. A video reproduction controller according to claim 4, wherein said detection means detects a change of average luminance in said video information as said special part.

8. A video reproduction controller according to claim 5, further comprising a means for outputting, to outside, display data to display said position on said recording medium where said special part is recorded and alternate display data to display said content of said special part based on said detection data.

9. A video reproduction controller according to claim 1, wherein said position information from said video reproducing device is a time code recorded on said recording medium.

10. A video reproduction controller according to claim 1, wherein said position information from said video reproducing device is a count information output by said video reproducing device as said recording medium is moved, and said count information represents a position relative to a start position of said recording medium.

11. A video reproduction controller according to claim 1, wherein said position information from said video reproducing device is a control information recorded on said recording medium for controlling a movement of said recording medium and output by said video reproducing device.

12. A video reproduction controller according to claim 1, further comprising:

a means for inputting said video information from said video reproducing device and outputting said video information to a video recording device; and a means for controlling said video recording device, based on said position information, to record said video information.

13. A storage medium removably loaded into a video reproduction controller and adapted to store a position information about a recording medium, in a predetermined format, when a special part is detected by reproducing a video information of a recorded video for producing a broadcasting program on said recording medium of said video reproducing device for editing said recorded video, said special part comprising flickers and/or an image having an entire image area which includes a specified image area, a ratio of the specified image area to th entire image area being beyond a first predetermined value, the specified image area being that portion of the entire image area having contrast and frequency range of spatial frequency peak value beyond a second predetermined value.

14. A storage medium according to claim 13 further storing detection data representing said special part of said video information in addition to said position information.

15. A storage medium according to claim 13, wherein said special part is a special pattern detected of said video information.

16. A storage medium according to claim 13, wherein said special part is a flicker detected of said video information.

17. A storage medium according to claim 13, wherein said special part is a change in average luminance detected of said video information.

18. A storage medium according to claim 13, wherein said position information from said video reproducing device is a time code recorded on said recording medium.

19. A storage medium according to claim 13, wherein said position information from said video reproducing device is a count information output by said video reproducing device as said recording medium is moved, and said count information represents a position relative to a start position of said recording medium.

20. A storage medium according to claim 13, wherein said position information from said video reproducing device is a control information recorded on said recording medium for controlling a movement of said recording medium and output by said video reproducing device.

* * * * *